United States Patent [19]

Nakano

[11] Patent Number: 4,692,601
[45] Date of Patent: Sep. 8, 1987

[54] IDENTIFICATION CARD INCLUDING SWITCHING MEANS FOR BUILT-IN BATTERY

[75] Inventor: Harumi Nakano, Tokyo, Japan

[73] Assignee: Casio Computer Co., Ltd., Tokyo, Japan

[21] Appl. No.: 840,938

[22] Filed: Mar. 18, 1986

[30] Foreign Application Priority Data

Mar. 25, 1985 [JP] Japan .............................. 60-42777[U]

[51] Int. Cl.$^4$ ............................................. G06K 5/00
[52] U.S. Cl. .................................... 235/380; 235/487; 235/442
[58] Field of Search ........................ 235/380, 487, 492

[56] References Cited

U.S. PATENT DOCUMENTS 3,971,916 7/1976 Moreno .
4,105,156 8/1978 Dethloff .
4,592,880 7/1985 Chaum ............................ 235/379 X

*Primary Examiner*—Harold I. Pitts
*Attorney, Agent, or Firm*—Frishauf, Holtz, Goodman & Woodward

[57] ABSTRACT

An identification card such as an IC card includes a built-in type battery, a central processing unit, a RAM, an FET switch and a latch circuit. An IC card production, the RAM is not energized by the battery when the FET switch is turned off in conjunction with the latch circuit. When the IC card is first used by an card issuer, the RAM is energized by turning on the FET switch in conjunction with the latch circuit.

12 Claims, 7 Drawing Figures

F I G. 7
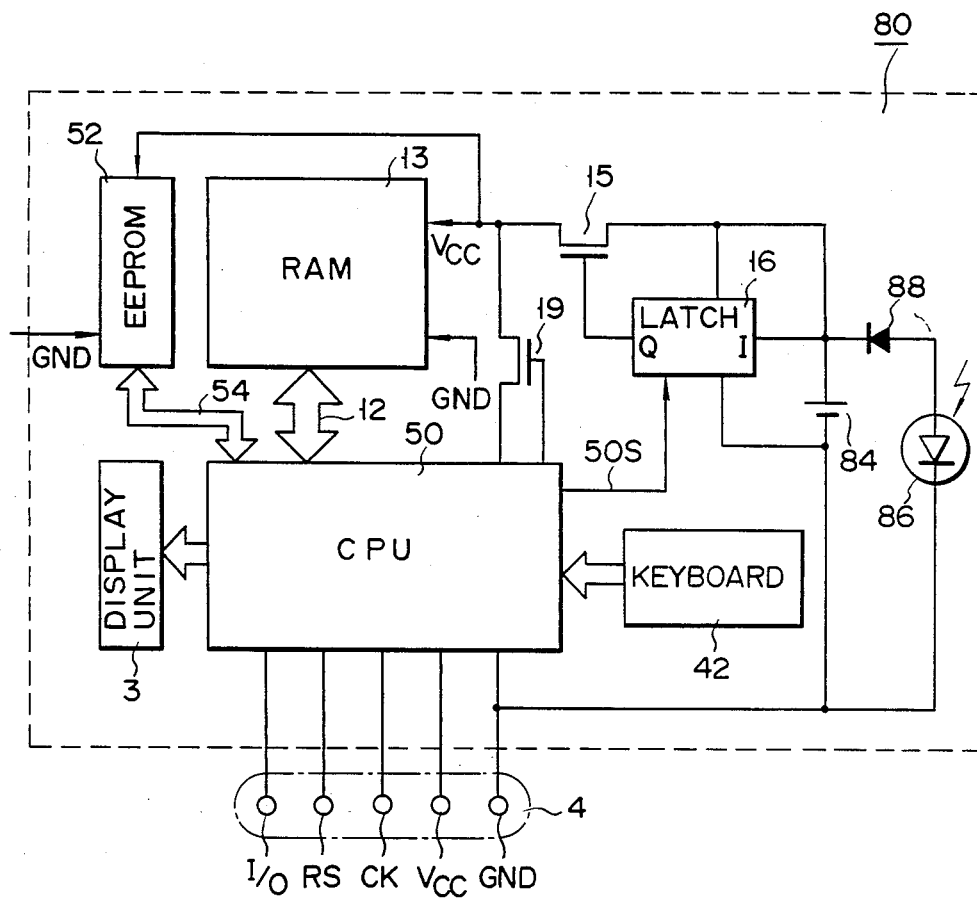

IDENTIFICATION CARD INCLUDING SWITCHING MEANS FOR BUILT-IN BATTERY

BACKGROUND OF THE INVENTION

1. Field of the Invention

The present invention generally relates to an identification card and, more particularly, to a switching means for a built-in type battery in an IC (integrated circuit) card that has a wide variety of applications.

2. Description of the Prior Art

Over the past few years, the use of personal cards issued from various credit card firms or banks have become increasingly more popular with which to buy articles without need of a cash transaction; therefore, recent years are called a card-age or a cashless-age. Hitherto, the card into which information has been stored by way of magnetization of a magnetic material is typical as such a kind of credit card. However, a memory capacity of information of this card is small and there is also a problem of identification of the card. Therefore, in recent years, an information card, i.e., what is called an IC card or intelligent card in which an integrated circuit consisting of a data processor, a data storage memory, and the like is built has been developed. According to this IC card, a very large amount of information can be stored and excellent identification can be obtained as compared with the conventional cards. In general, an EPROM (electrically programmable ROM) or a RAM (random access memory) is used as a memory to store information in the IC card. In the case of using the RAM, although the stored data can be extremely easily rewritten, it is necessary to equip a power backup battery or dry cell for this RAM in the IC card. However, in the power backup battery or dry cell built-in type card, it is a general manner to preliminarily power backup the RAM at the shipping stage of the card factory. Thus, drive current flows through the RAM from the shipping stage of the factory and the battery starts to be consumed. There is a problem such that as the time interval from the shipping of the factory until the IC card is given to the user is long, the effective period of time when the user can actually use the IC card is reduced.

The memory fabricated by using the CMOS technology of the power consumption saving type has recently been developed. However, not only the volume but also the electric power capacity of the battery which can be built in this kind of IC card (having a thickness of 0.8 mm as a standard size) is necessarily, extremely limited. Therefore, particularly, the above-mentioned problems are typical in the battery which must be built in such a thin card.

The present invention is made in consideration of the foregoing drawbacks. An object of the invention is to provide a battery built-in type identification card which can prevent the unwanted power consumption of the battery for power backup purposes and can prolong the effective use period of time of the identification card.

SUMMARY OF THE INVENTION

The object of the invention can be accomplished by providing an identification card comprising a built-in type battery, means for processing data necessary for the identification card, storage means for storing at least said data upon being energized by said battery, first switching means interposed between said battery and said storage means, and switching control, means energized by said battery, for controlling said switching means to be turned off in a first condition and to be turned on in a second condition in response to a command signal externally supplied via said identification card to said switching control means, whereby said storage means is not energized by said battery in the first condition, but is energized in the second condition.

BRIEF DESCRIPTION OF THE DRAWINGS

The invention is best understood by reference to the accompanying drawings, in which:

FIG. 7 is a block diagram of an internal circuit of the IC shown in FIG. 6.

DETAILED DESCRIPTION OF THE PREFERRED EMBODIMENTS BASIC IDEA

Basic idea of this invention is to prevent power of a built-in type small battery from being undesirably dissipated by maintaining a switching circuit off until an actual use of an identification card. The switching circuit is interposed between the power backup battery and a data storage memory.

FIRST MODE

Figure 1:
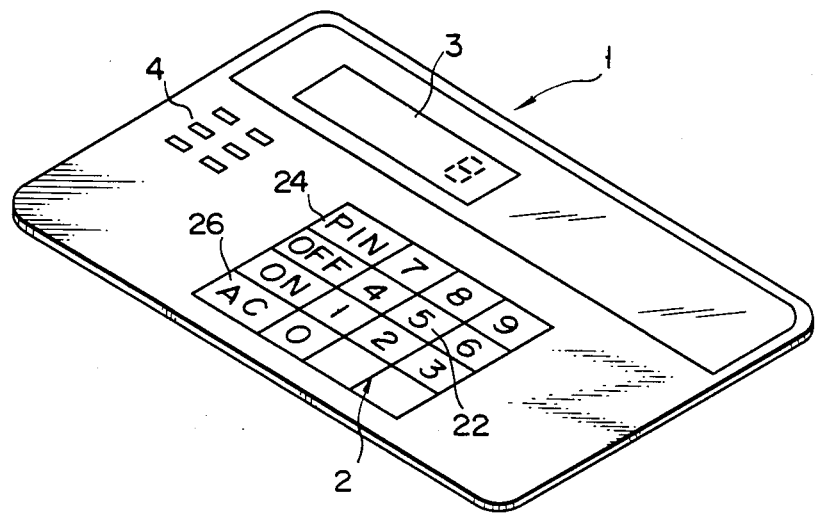
FIG. 1 is a perspective view of an IC card according to a first mode of the invention.
Figure 2:
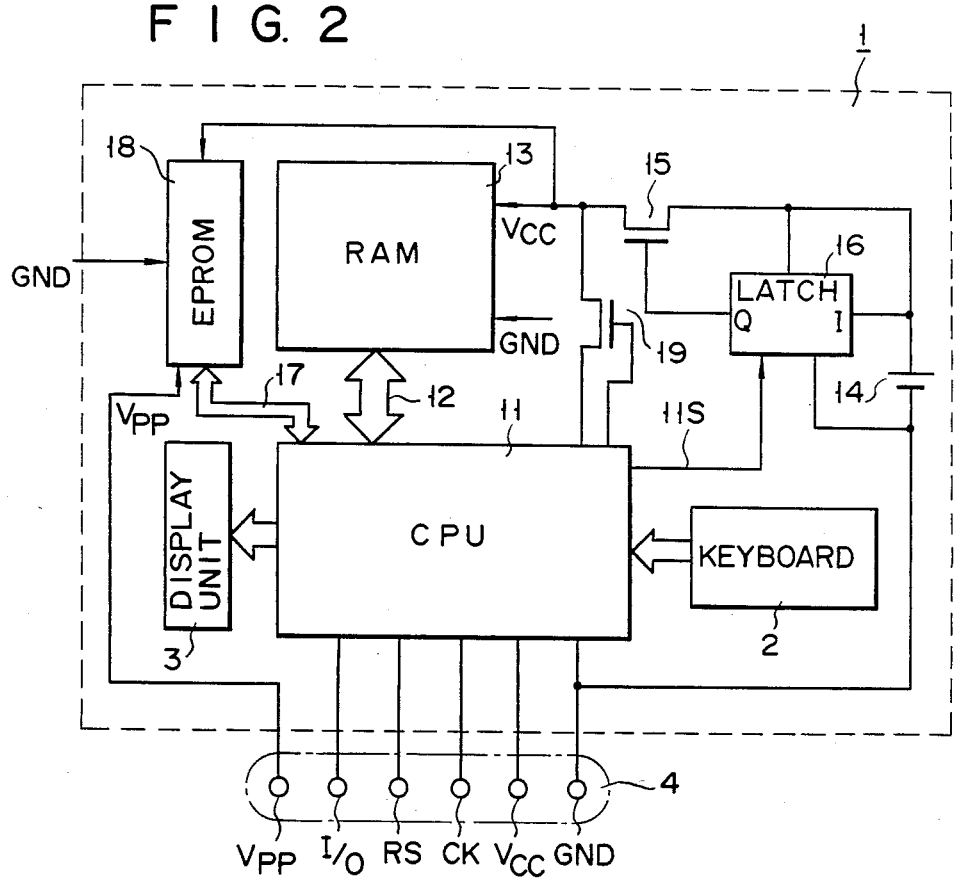
FIG. 2 is a block diagram of an internal circuit of the IC card shown in FIG. 1.
Figure 3:
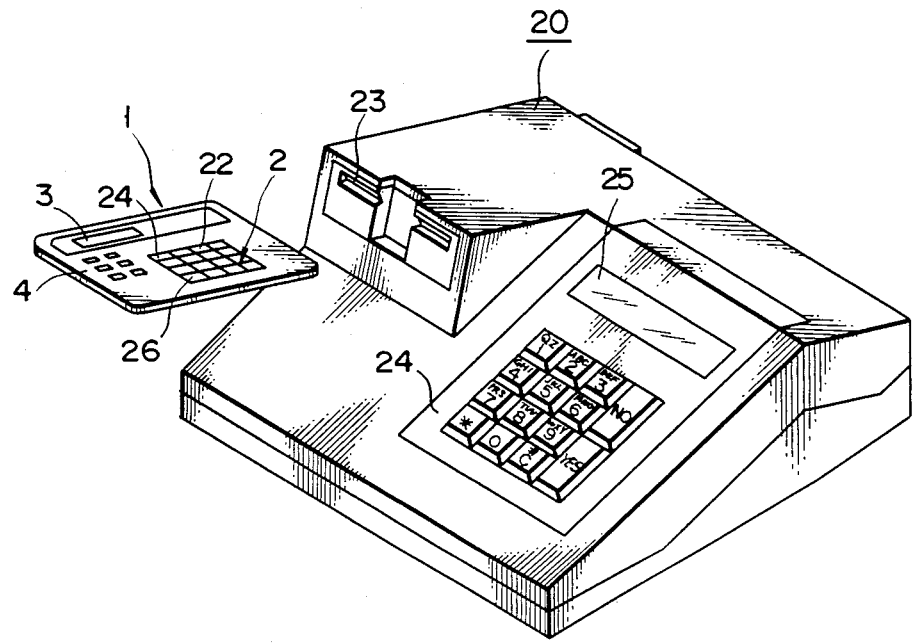
FIG. 3 shows an IC card terminal and the IC card of FIG. 1.

In FIGS. 1, 2 and 3, an identification card 1 is shown operating in a first mode according to the present invention.

FIG. 1 shows an appearance of an IC card 1 including an IC module. A keyboard 2, a liquid crystal display unit 3, and a connector unit 4 adapted to be electrically connected to an IC card terminal which will be explained later with reference to FIG. 3 are provided on the front surface of IC card 1. Keyboard 2 is provided with numeral entry keys 22, a personal identification number (PIN) input key 24, and power ON/OFF clear keys 26 to make operative the functions necessary as an IC card.

A circuit diagram of electronic circuits which are arranged in IC card 1 will now be described with reference to FIG. 2. In FIG. 2, a CPU (Central Processing Unit) 11 is provided. Keyboard 2, display unit 3, and connector unit 4 are connected to CPU 11. Connector unit 4 is provided with an I/0 (Input/Output) terminal "I/0," a reset terminal "RS," a clock terminal "CK," a positive power supply terminal "Vcc," a ground terminal "GND," and another power supply terminal "Vpp." A RAM (Random Access Memory) 13, as a first memory to store data, is connected to CPU 11 through a bus line 12. RAM 13 is fabricated using, for example, a CMOS transistor.

A power backup voltage "Vcc" is applied from so-called a "paper battery" or a "paper-thin battery" 14 to RAM 13 through a first switching element 15. This paper battery is made of a lithium battery having, for instance, a thickness of 0.5 mm and a power capacity of 3 V/20 mA. The shape and size of the battery can be freely designed to be adapted to battery spacing. Type "CS1634" is available from TOSHIBA DENCHI K.K.

First switching element 15 is fabricated by, e.g., a MOS transistor and an ON/OFF control signal is supplied from a latch circuit 16 to element 15. Latch circuit 16 is fabricated by a CMOS transistor and a drive voltage is supplied from paper battery 14 to latch circuit 16. Latch circuit 16 gives an OFF signal to first switching element 15 in the initial state, namely, at the manufacturing stage in the factory. When a "1" signal from CPU 11 is set to latch circuit 16 through a signal line 11S, latch circuit 16 supplies an ON signal to first switching element 15.

The negative terminal of paper battery 14 is connected to ground terminal "GND" of connector unit 4. EPROM (erasable programmable ROM) 18 is connected as a second memory to CPU 11 through a bus line 17. A PIN (Personal Identification Number) of IC card 1 can be stored in EPROM 18 and this PIN is functionally important. Since power supply terminal "Vpp" is connected to EPROM 18, data can be newly written in EPROM 18. Positive voltage Vcc is also applied from paper battery 14 to EPROM 18 through first switching element 15. In addition, a second switching element 19 is provided between the load side of first switching element 15 and CPU 11 and used to turn off the power supply to CPU 11 and display unit 3. Second switching element 19 is coupled via CPU 11 to the "OFF" key of keyboard 2 in FIG. 1.

In IC card 1, constituted as mentioned above, the drive voltages are supplied from paper battery 14 only to RAM 13, EPROM 18, first switching element 15, and latch circuit 16. To the contrary, as shown in FIG. 3, when IC card 1 is inserted to an IC card terminal 20 which is installed in, e.g., IC card issuer, bank, store, or the like, the voltage "Vcc" is applied from IC card terminal 20 to the other circuit elements of IC card 1.

In IC card 1, first switching element 15 is retained in the OFF state by the OFF signal from latch circuit 16 when it is shipped from the manufacturing factory of IC cards, so that the power backup voltage by paper battery 14 is not applied to RAM 13 at this stage. In this case, latch circuit 16 is energized by paper battery 14 as mentioned above. Therefore, a very small amount of electric power is consumed by only latch circuit 16 and it can be substantially ignored. In particular, since latch circuit 16 is constituted of a MOSFET, a remarkable power saving effect is obtained.

IC card 1 shipped from the factory is sent to the card issuer and both RAM 13 and EPROM 18 are set to the usable state immediately before IC card 1 is handed to the user from the card issuer. Namely, the card issuer attaches IC card 1 into IC card terminal 20 from an inserting port 23 as shown in FIG. 3 and gives an instruction to set a "1" signal to latch circuit 16 to IC card 1 by way of PIN input key 24. This "1" signal setting command is input to CPU 11 through I/0 terminal I/0 of connector unit 4.

CPU 11 sets the "1" signal to latch circuit 16 through signal line 11S in response to the command from IC card terminal 20, thereby turning on first switching element 15. When first switching element 15 is turned on, the backup voltage is supplied from paper battery 14 to RAM 13 and EPROM 18, so that RAM 13 and EPROM 18 can be accessed by CPU 11. Since the voltage is applied from paper battery 14 to latch circuit 16, when latch circuit 16 receives the "1" signal from CPU 11, latch circuit 16 holds this state and continues energizing RAM 13 and EPROM 18 until the voltage of paper battery 14, necessary for the power supply, is lowered.

On one hand, CPU 11 outputs a "1" signal to latch circuit 16 to turn on first switching element 15. Thereafter, CPU 11 writes special data into RAM 13 and again reads it to discriminate whether RAM 13 correctly operates or not. CPU 11 outputs the result of the discrimination to IC card terminal 20. IC card terminal 20 checks to see if IC card 1 can be handed to the user or not on the basis of the result of the discrimination which is sent from IC card 1. IC card terminal 20 then sends the result of this discrimination to a display unit 25 to indicate it. The card issuer checks the display content of display unit 25 of IC card terminal 20 and gives this IC card 1 to the present user when the result of the check of the card is OK. Thereafter, the user registers the personal identification number of himself to IC card 1, so that he can actually use IC card 1.

After completion of this PIN registration step, this IC card can function as an ordinary IC card. Namely, before inserting IC card 1 into IC card terminal 20 installed in, e.g., a store, the user of this card inputs the PIN code from keyboard 2 of IC card 1 by use of PIN input key 24 and numeral entry keys 22. The input PIN code data and the PIN code data preliminarily stored (registered) in EPROM 18 are compared by CPU 11 and the resultant data for discriminating whether the user of this card is the authorized person or not, is output from CPU 11. This resultant data is temporarily stored into RAM 13.

By inserting this IC card 1 into card terminal and executing predetermined operations in the store, the normal transaction by IC card 1 is performed.

SECOND MODE

Figure 4:
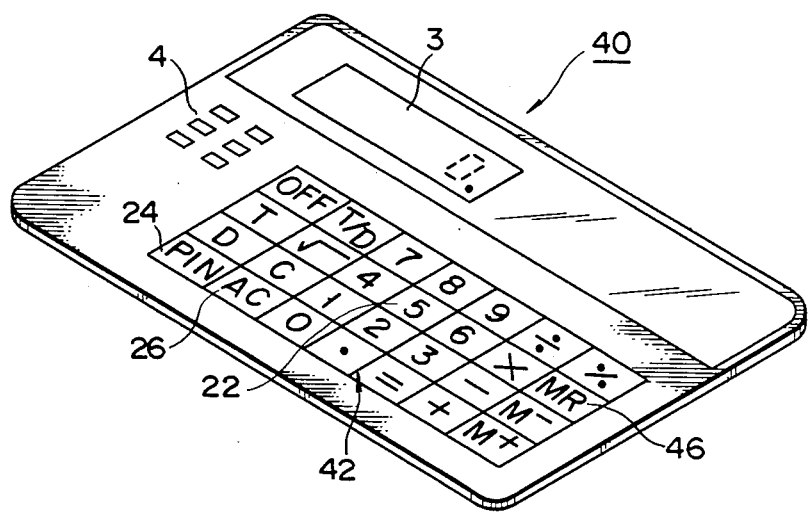
FIG. 4 is a perspective view of an IC card according to a second mode of the invention.

FIG. 4 is a perspective view of an IC card 40 operable in a second mode according to the invention. The same parts and components as those in IC card 1 shown in FIG. 1 are designated by the same reference numerals and their descriptions are omitted. As shown in FIG. 4, a keyboard 42 is provided with function keys 46 as keys for a calculator as well as number entry keys 22. In addition, function keys 24 and 26 of the IC card are also similarly provided.

Figure 5:
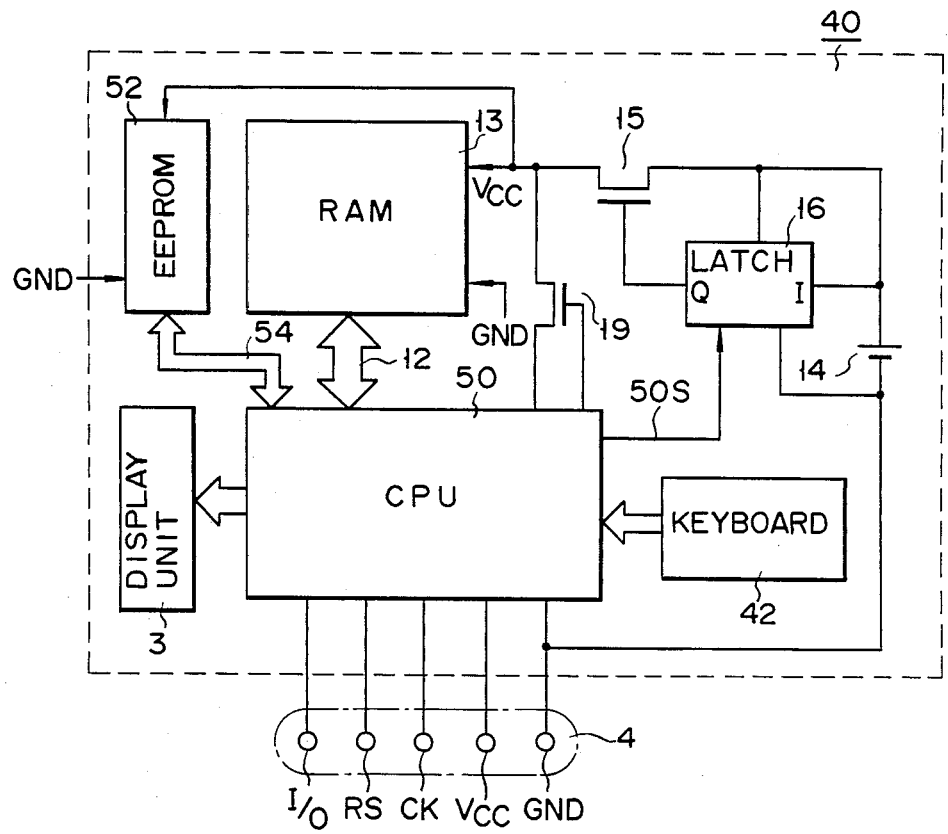
FIG. 5 is a block diagram of an internal circuit of the IC card shown in FIG. 4.

FIG. 5 shows an internal circuit diagram of IC card 40 of FIG. 4. The same elements as those in the circuit diagram shown in FIG. 2 are designated by the same reference numerals and their descriptions are omitted. According to IC card 40 operable in the second mode, keyboard 42 having the function as the ordinary calculator as well is connected to a CPU 50. An ON signal from CPU 50 is supplied to latch circuit 16 (switching means) through a signal line 50S. Display unit 3, connector unit 4, RAM 13, and an EEPROM (electrically erasable programmable ROM) 52 serving as an IC card function are connected similarly to FIG. 2. The personal identification number, PIN is preliminarily stored in EEPROM 52 connected to CPU 50 through a bus line 54. It should be understood that although there is no indiciation in FIG. 5, EEPROM 52 employs a DC-DC converter for converting the source voltage "Vcc" into more higher voltage that can be used for writing data therein.

Latch circuit 16 is in the OFF state from the time when IC card 40 is manufactured until the use of this IC card is started by the issuer, so that relatively large power consumption occurring in built-in paper battery 14 to RAM 13 and EEPROM 52 can be avoided.

In this embodiment, by operating function keys 46 of keyboard 42, the ordinary calculating process can be performed by CPU 50 and the result can be displayed by display unit 3.

THIRD MODE

Figure 6:
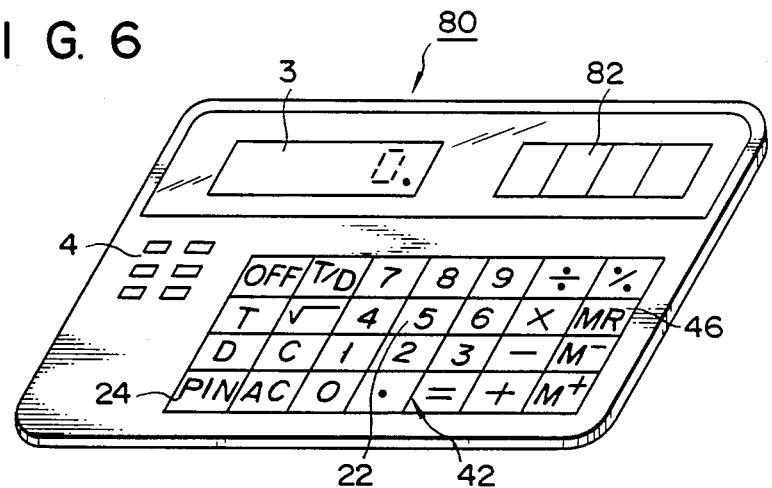
FIG. 6 is a perspective view of an IC card according to a third mode of the invention.

FIG. 6 is an external view of an IC card 80 operable in a third mode of the invention. The same elements as those in FIG. 4 are designated by the same reference numerals and their descriptions are therefore omitted.

A solar cell panel 82 is provided on the right side of display unit 3.

FIG. 7 is an internal circuit diagram of IC card 80 of FIG. 6. The same circuit elements as those in FIG. 5 are designated by the same reference numerals and their descriptions are therefore omitted.

In the circuit of FIG. 7, a rechargeable small battery 84 is used in place of paper battery 14 in FIG. 5. Such a rechargeable battery has been recently developed by HITACHI LTD. such that metal lithium is used as the negative pole, whereas titanium disulfide is used as the positive pole thereof. A diode 88 of the polarity shown in the diagram is connected between the positive polarity of battery 84 and the anode of a solar cell assembly 86 of solar cell panel 82. Diode 88 makes it possible to prevent the reverse current from flowing into solar cell assembly 86 from battery 84 (namely, the reverse current is produced in the case of the voltage drop when solar cell panel 82 is put in the dark condition or the like.)

With this arrangement, the inherent power of the battery having an extremely small power capacity which needs to be enclosed in the very thin plate such as IC card 80 can be charged by solar cell panel 82. Thus, there is a feature such that the effective use period of time of IC card 80 can be prolonged.

As described above, according to the present invention, the switching element which was initialized to the OFF state is provided between the data memory and the power backup battery built in the IC card. When the card is actually used, the switching element is turned on to supply the backup voltage to the data memory. Therefore, the unwanted power consumption of the power backup battery can be prevented during the time period from the shipping stage of the factory until the IC card is handed to the user so that the effective use period of the IC card can be substantially prolonged.

What is claimed is:

1. An identification card comprising:
   a built-in type battery;
   means for processing data necessary for the identification card;
   storage means for storing at least said data upon being energized by said battery;
   first switching means interposed between said battery and said storage means; and
   switching control means, energized by said battery, for controlling said switching means to be turned off in a first condition and to be turned on in a second condition in response to a command signal externally supplied via said identification card to said switching control means, whereby said storage means is not energized by said battery in the first condition, but is energized in the second condition.

2. An identification card as claimed in claim 1, wherein said switching means is a MOS (metal oxide semiconductor) field effect transistor.

3. An identification card as claimed in claim 1, wherein said switching control means is a latch circuit fabricated of CMOS (complementary metal oxide semiconductor) transistors.

4. An identification card as claimed in claim 1, wherein said built-in type battery is a paper-thin battery.

5. An identification card as claimed in claim 1, wherein said storage means is a RAM (random access memory).

6. An identification card as claimed in claim 1, wherein said storage means is constructed of a RAM and a PROM (programmable read only memory).

7. An identification card as claimed in claim 1, further comprising:
   a keyboard having at least a power on/off key and an identification card function key;
   second switching means connected between a load side of said first switching means and said processing means, the supply of power to said processing means from said battery being under the control of said second switching means through operation of said power on/off key; and
   a display panel, connected to said processing means, for displaying said data.

8. An identification card as claimed in claim 1, further comprising electrical connecting means connected to said processing means for receiving at least said external command signal.

9. An identification card as claimed in claim 1, further comprising a solar cell panel connected to said built-in type battery through a reverse current protection diode.

10. An identification card comprising:
    a built-in type battery;
    means for processing first data necessary for the identification card and second data necessary for arithmetic operations;
    storage means for storing said first and second data upon being energized by said battery;
    first switching means interposed between said battery and said storage means; and
    switching control means, energized by said battery, for controlling said switching means to be turned off in a first condition and to be turned on in a second condition in response to a command signal externally supplied via said identification card to said switching control means, whereby said storage means is not energized by said battery in the first condition, but is energized in the second condition.

11. An identification card as claimed in claim 10, further comprising:
    a keyboard including arithmetic operation keys, a power on/off key and an identification card function key;
    second switching means connected between a load side of said first switching means and said processing means, the supply of power to said processing means from said battery being under the control of said second switching means through operation of said power on/off key; and
    a display panel, connected to said processing means, for displaying said first and second data.

12. An identification card as claimed in claim 10, further comprising a solar cell panel connected to said built-in type battery through a reverse current protection diode.

* * * * *